United States Patent

Miura et al.

[11] Patent Number: 5,850,851
[45] Date of Patent: Dec. 22, 1998

[54] CHECK VALVE AND FUEL TANK UTILIZING THE SAME

[75] Inventors: Natsushi Miura, Aichi-ken; Hiroyuki Hagano, Inazawa; Masayuki Nakagawa, Iwakura, all of Japan

[73] Assignee: Toyoda Gosei Co., Ltd., Aichi-ken, Japan

[21] Appl. No.: 617,098

[22] Filed: Mar. 18, 1996

[30] Foreign Application Priority Data

Mar. 28, 1995 [JP] Japan .................................... 7-096116

[51] Int. Cl.$^6$ .................................................. F16K 21/04
[52] U.S. Cl. .................. 137/583; 137/540; 137/543.17; 137/592
[58] Field of Search .................................. 137/583, 540, 137/543.17, 855, 592

[56] References Cited

U.S. PATENT DOCUMENTS

| | | | |
|---|---|---|---|
| 1,244,286 | 10/1917 | Breinl | 137/543.17 |
| 1,385,147 | 7/1921 | Prellwitz | 137/540 |
| 1,615,279 | 1/1927 | Iversen | 137/543.17 |
| 3,788,071 | 1/1974 | Brewer | 137/543.17 |
| 3,911,949 | 10/1975 | Hilden et al. | 137/592 |
| 4,164,238 | 8/1979 | Riedel | 137/885 |
| 4,726,395 | 2/1988 | Howes et al. | 137/540 |

FOREIGN PATENT DOCUMENTS

| | | |
|---|---|---|
| 1-173023 | 1/1989 | Japan . |
| 4-41173 | 4/1992 | Japan . |

*Primary Examiner*—A. Michael Chambers
*Attorney, Agent, or Firm*—Cushman, Darby & Cushman, IP Group of Pillsbury Madison & Sutro LLP

[57] ABSTRACT

A check valve (32) includes a cylindrical body (32) and a valve plate (32) attached to one end of the body (32) to open and close a flow outlet. A stepped seat element (36a) having a seat surface (36a) is formed along the periphery of the flow outlet of the body (40). The valve plate (40) is press-cut from a thin stainless steel plate to be integrally formed as a leaf spring. The valve plate includes a leaf element movable with respect to the seat surface so as to close and open the flow outlet, an arm element (41) coupled to the leaf element (41) via a joint element, and a base element connected to the arm element and received by a valve support projection on the cylindrical body.

18 Claims, 17 Drawing Sheets

CHECK VALVE AND FUEL TANK UTILIZING THE SAME

The priority document, Japanese Patent application No. 7-96116, filed in Japan on Mar. 28, 1995 is hereby incorporated into the subject application by this reference.

BACKGROUND OF THE INVENTION

1. Field of the Invention

The present invention relates to a check valve and also to a fuel tank having a check valve attached to a fuel supply conduit for feeding a supply of fuel into the tank.

2. Description of Related Art

As conventionally known, fuel tanks in automobiles are generally provided with a check valve for preventing fuel vapor, collected in a tank in the fuel-feeding process, from being undesirably released to the atmosphere. FIG. 26 is a partial, side sectional view illustrating an essential part of a conventional fuel tank structure incorporated in automobiles. A fuel tank 100 includes a fuel supply mechanism 110 on a side wall portion 104 of a tank body 102. The fuel supply mechanism 110 includes a connection pipe 112 securely fixed to the side wall portion 104 by means of screws, a bellows inlet hose 114 attached to the open end of the connection pipe 112, an inlet filler pipe 116 coupled with the open end of the inlet hose 114, and a cap 118 attached to a fuel supply lip 116a of the inlet filler pipe 116.

A check valve 120 is attached within an opening 112a of the connection pipe 112 for preventing fuel vapor collected in the tank body 102 from being undesirably released to the atmosphere in the fuel-feeding process.

FIG. 27 is a perspective view illustrating appearance of the check valve 120. The check valve 120 includes a support fitting 122 securely welded to a curved surface 112b of the connection pipe 112, a valve member 126 pivotally supported by the support fitting 122 via a shaft member 124 to cover the opening 112a of the connection pipe 112, and a coil spring 128 carried on the shaft member 124 to bias the valve member 126 towards a valve-closing position.

In the fuel tank 100 thus constructed, when a supply of fuel is fed through the fuel supply lip 116a of the inlet filler pipe 116 after removal of the cap 118, the supplied fuel opens the valve member 126 of the check valve 120 against the bias of the coil spring 128 to be fed into the tank body 102. Upon completion of the fuel supply to the fuel tank 100, the check valve 120 is closed to prevent fuel vapor collected in the tank body 102, from being undesirably released to the atmosphere.

The check valve 120 is generally attached to the fuel tank 100 in the following manner. The support fitting 122 of the check valve 120 is first welded to the curved surface 112b of the connection pipe 112. The valve member 126 and the coil spring 128 are then mounted on the support fitting 122 via the shaft member 124, whose ends are subsequently caulked. This allows the valve member 126 supported by the support fitting 122 to freely open and close while being biased by the coil spring 128. In this mounting process, it takes a long time and much labor to weld the support fitting 122 to the curved surface 112b of the connection pipe 112.

The valve member 126 of the check valve 120 may be made of resin material. In such cases, it is rather difficult to weld the connection pipe 112 with the check valve 120 previously mounted thereon to the tank body 102, because of the possible effects of welding heat on the resin material. The connection pipe 112 is thus secured to the tank body 102 by means of screws. This structure requires a sealing member to ensure the sufficient sealing properties, thereby increasing the number of parts.

There have been requirements for reducing the number of parts in the check valve 120 and simplifying its structure for further cost reduction.

SUMMARY OF THE INVENTION

The object of the present invention is thus to provide an easily-assembled check valve including a fewer number of parts than that of conventional valves, as well as providing a fuel tank utilizing such a check valve.

The above and the other related objects are realized by a check valve including:

a passage-defining member defining a passage leading to a fluid flow port, the passage-defining member having a seat element disposed around the flow port of the passage; and a valve plate constructed and arranged to open and close the flow port comprising a leaf element, an arm element, and a base element, which are integrally made from an elastic plate, the leaf element being constructed and arranged to move between a valve-opening position for opening the flow port and a seated position for closing the flow port, the leaf element being constructed and arranged to be seated on the seat element when in the seated position and separated from the seat element when in the valve-opening position, the base element being fixed to the passage-defining member adjacent the flow port, the arm element being connected to the leaf element at a first position thereof and being connected to the base element at a second portion thereof;

wherein when the leaf element is biased to move to its valve opening position, the arm element moves relative to the base element defining a space between the leaf element and the seat element, thereby permitting fluid to flow past the check valve and the arm element is constructed and arranged to apply a pressing force for pressing the leaf element toward the seat element of the passage-defining member, thereby moving the leaf element to the seated position when the bias on the leaf element is removed.

In the check valve of the present invention, the valve plate opens and closes a flow port of the passage defined by the passage-defining member. The valve plate is integrally formed from a thin plate with elasticity to include a leaf element, an arm element, and a base element. The base element of the valve plate is secured to the passage-defining member and connected to the leaf element via the arm element. The arm element functions as a spring for applying a pressing force to seat the leaf element onto the seat element. When the leaf element is biased by the force of a fluid, the arm element is inclined or moved relative to the foot element linked with the base element. Thus, the leaf element is moved to the valve-opening position. Since the arm element generally presses the leaf element against the seat element, the check valve of the present invention realizes excellent sealing properties under the valve-closing condition.

The valve plate includes the leaf element, the arm element for pressing the leaf element, and the base element received by the passage-defining member, which are integrally formed from a thin plate. The check valve of the invention consists of only two parts, that is, the valve plate and the passage-defining member, thereby having simple structure and being easily assembled.

The valve plate may be made of any thin plate having sufficient elasticity; for example, metals and resin materials.

The valve plate may have any desired shape according to the requirements. The valve plate of the present invention is preferably incorporated in a fuel tank of automobiles and works to prevent fuel vapor collected in a tank body from being undesirably released to the atmosphere through a fuel supply mechanism of the fuel tank.

In accordance with one preferable application, the fuel supply mechanism of the fuel tank includes a connection pipe secured to a tank body and a rubber hose connecting with the connection pipe. The passage-defining element of the check valve is provided with a flange element extending outwardly from an end of an outer surface of the passage-defining element. In this structure, the passage-defining element of the check valve is fitted in an opening of the connection pipe, while the flange element is held by the rubber hose, so that the check valve is securely fixed to the opening of the connection pipe.

In accordance with another preferable application, the fuel supply mechanism includes a connection pipe welded to the tank body, a rubber hose connected to the connection pipe, and an inlet filler pipe coupled with the rubber hose. In this structure, the check valve is attached to an opening of the inlet filler pipe directly connecting with the rubber hose.

These and other objects, features, aspects, and advantages of the present invention will become more apparent from the following detailed description of the preferred embodiment together with the accompanying drawings.

DETAILED DESCRIPTION OF THE PRESENTLY PREFERRED EXEMPLARY EMBODIMENT

Figure 1:
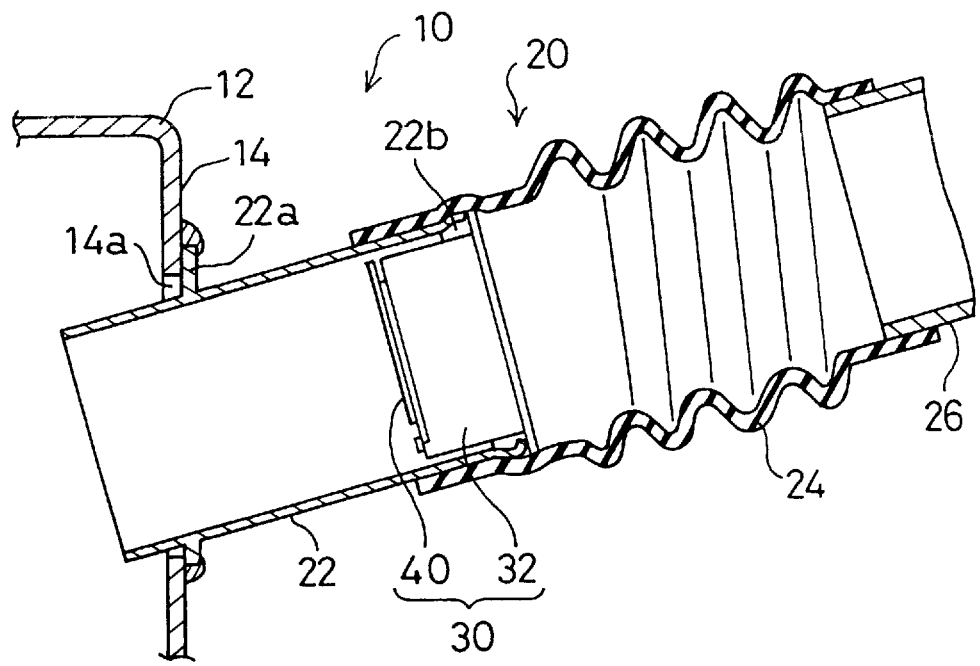
FIG. 1 is a cross-sectional view illustrating an essential part of a fuel tank with a check valve embodying the principles of the present invention.

FIG. 1 is a cross-sectional view illustrating an essential part of a fuel tank 10. The fuel tank 10 includes a fuel supply mechanism 20 disposed on a side wall portion 14 of a tank body 12 to feed a supply of fuel into the tank body 12. The fuel supply mechanism 20 includes a connection pipe 22 securely welded to the side wall portion 14, a bellows inlet hose 24 attached to an opened end of the connection pipe 22, an inlet filler pipe 26 coupled with an opened end of the inlet hose 24, and a cap (not shown) attached to a fuel supply opening of the inlet filler pipe 26.

A first end of the connection pipe 22 is inserted into an opening 14a formed in the side wall portion 14 and welded to the side wall portion 14 via a flange element 22a. A check valve 30, which opens in the fuel-feeding process and closes otherwise, is attached to a second end 22b of the connection pipe 22.

In the fuel supply mechanism 20 thus constructed, when a supply of fuel is fed from a fuel pump spout (not shown) through the inlet filler pipe 26 after removal of a fuel cap, the supplied fuel passes through the inlet hose 24 to reach the check valve 30, opens the check valve 30, and is fed into the tank body 12 via the connection pipe 22. The check valve 30 is generally placed in a valve-closing position, except during fuel feeding, so as to prevent fuel vapor from being released to the atmosphere even when the fuel cap is removed.

Figure 2:
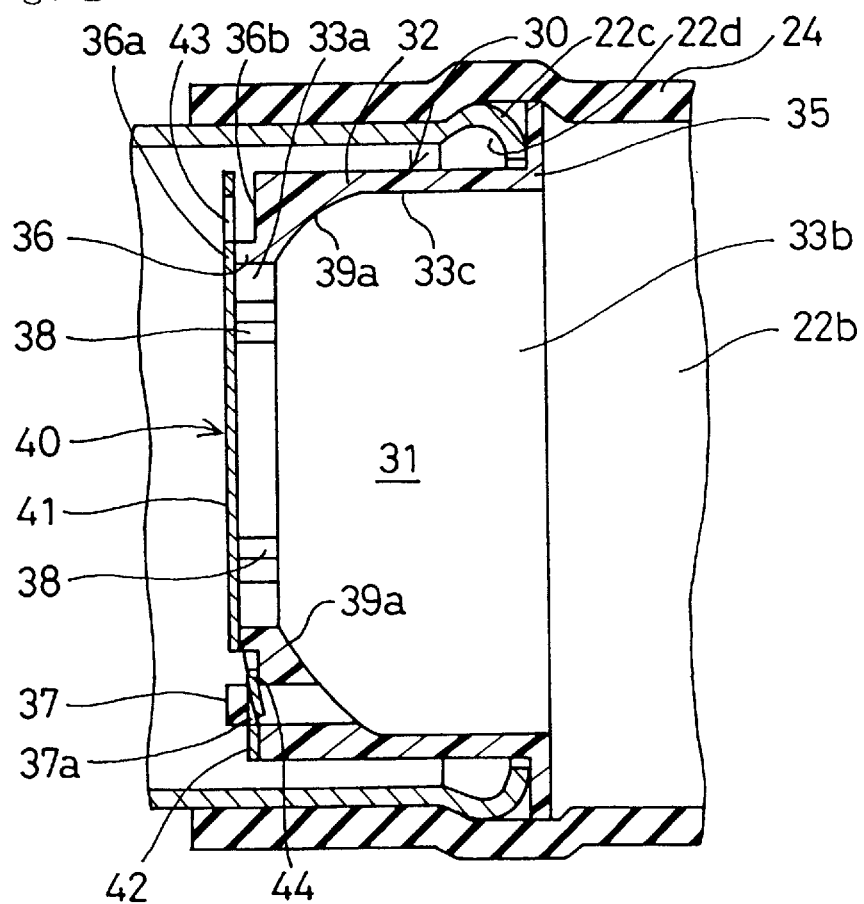
FIG. 2 is an enlarged cross-sectional view illustrating the check valve of FIG. 1 and its peripheral elements and shown in a closed position.
Figure 3:
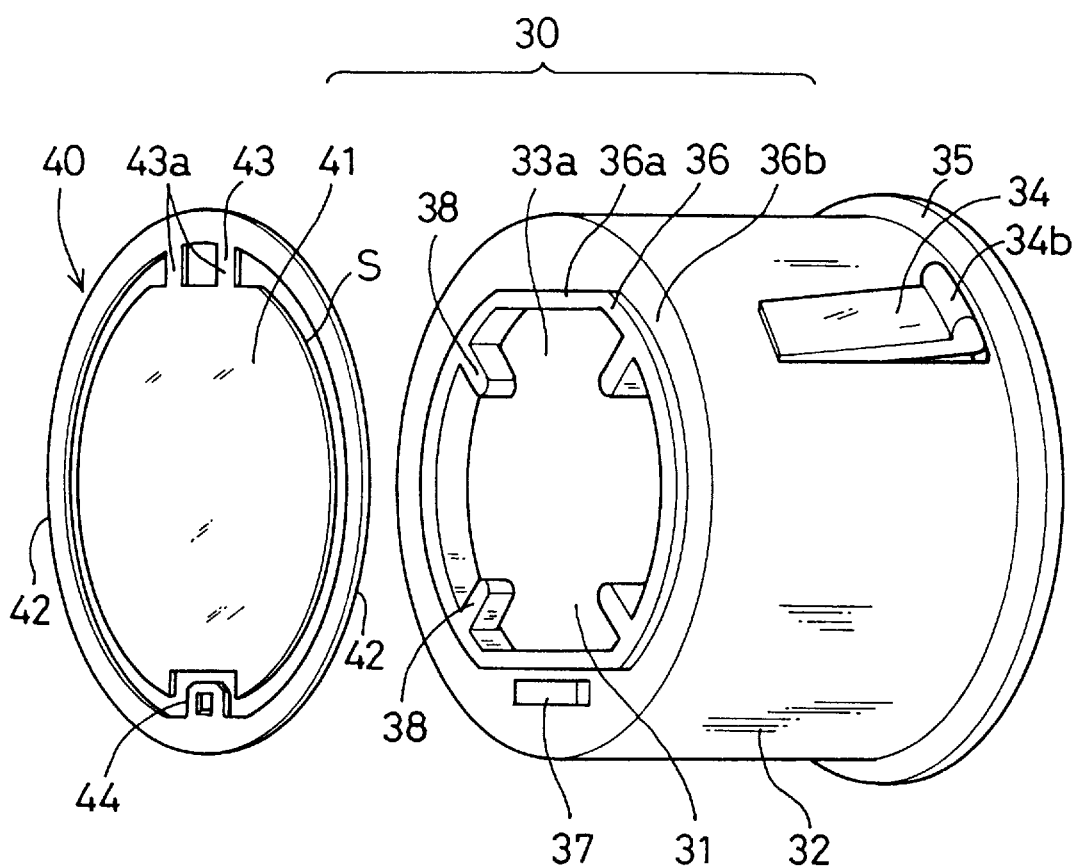
FIG. 3 is an exploded perspective view of the check valve of the invention.

Structure and operation of the check valve 30 are described in detail below. FIG. 2 is a cross-sectional view illustrating the check valve 30 and its peripheral elements, and FIG. 3 is an exploded perspective view of the check valve 30. The check valve 30 includes a passage-defining member in the form of a cylindrical body 32 and a valve plate 40 attached to one end of the body 32 to open and close a flow outlet 33a.

The body 32 defines a fuel path 31 having a flow inlet 33b, closer to the inlet hose 24, and a flow outlet 33a, closer to the connection pipe 22. The body 32 is provided with a resilient fitting tab 34 (see FIG. 3) formed by cutting part of the body 32. The fitting tab 34 has an engagement element 34b formed on one end thereof. The engagement element 34b of the fitting tab 34 engages with a fitting recess 22d in a curved portion 22c of the connection pipe 22, so that the check valve 30 is detachably affixed to the connection pipe 22.

A flange 35 is formed around the flow inlet 33b of the body 32. The flange 35 is press-fitted into the inlet hose 24 such that the body 32 of the check valve 30 is securely held and supported by the resilient force of the inlet hose 24.

A substantially circular, stepped seat element 36 for receiving the valve plate 40 is formed along the circumference of the flow outlet 33a of the body 32. The stepped seat element 36 includes an upper seat surface 36a and a lower peripheral surface 36b surrounding the upper seat surface 36a. A valve support projection 37 for use in supporting the valve plate 40 is further disposed below the flow outlet 33a of the body 32. The valve support projection 37 is provided with a notch 37a as shown in the enlarged views of FIGS. 7 and 8. The fitting process of the valve plate 40 will be described below.

Four support projections 38 are formed at the flow outlet 33a of the body 32 and extend radially towards the center of the flow outlet 33a. The support projections 38 effectively prevent the valve plate 40 from falling into the fuel path 31.

The body 32 further includes a tapered surface 39a (FIG. 6) arranged immediately before the flow outlet 33a. The tapered surface 39a connects an inner wall 33c of the fuel path 31 defined by the body 32 with the flow outlet 33a to form a smooth, continuous face in the fuel path 31.

Figure 4:
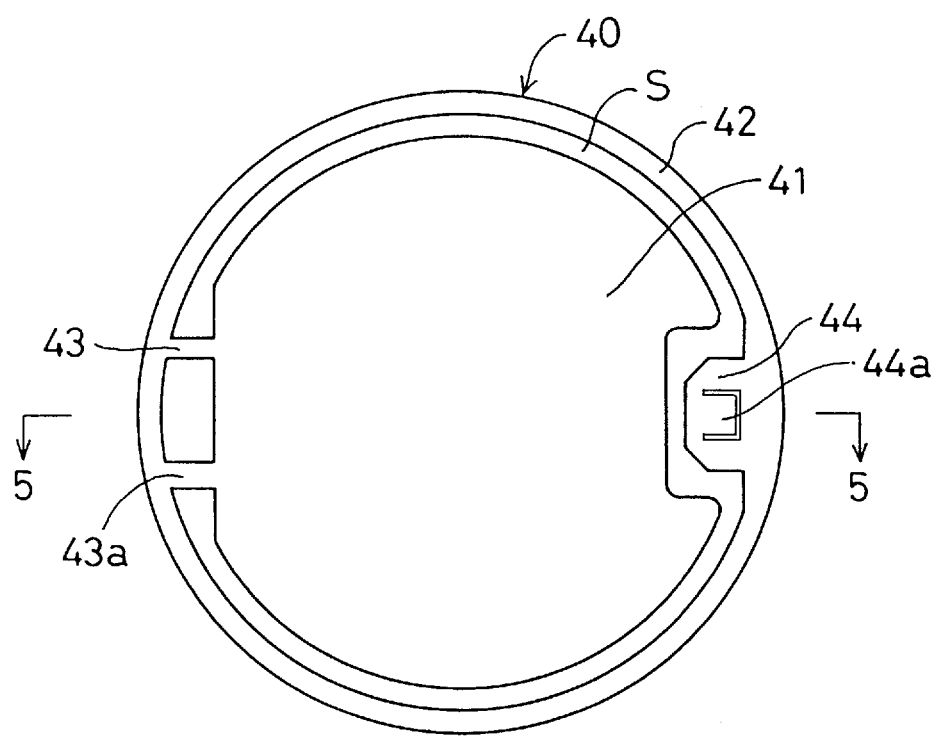
FIG. 4 is a plan view illustrating the valve plate of the check valve of the invention.
Figure 5:
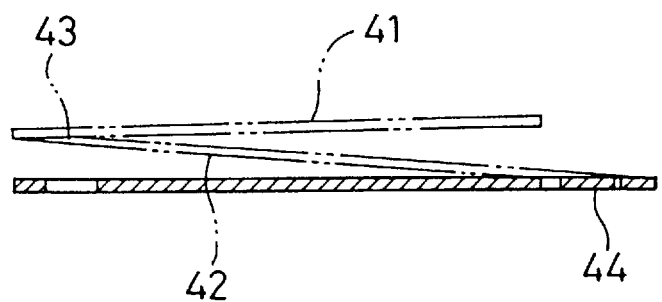
FIG. 5 is a cross-sectional view illustrating the valve plate, taken on the line 5—5 in FIG. 4.
Figure 6:
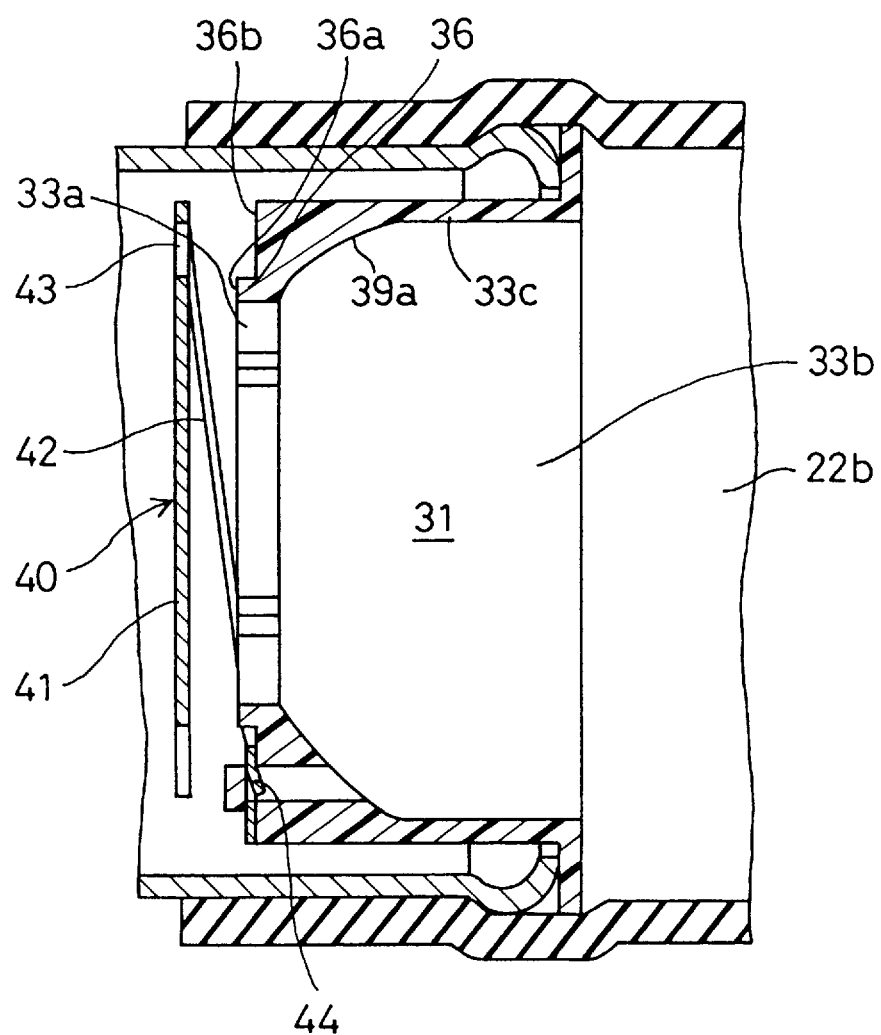
FIG. 6 is a cross-sectional view illustrating the check valve of the invention in the valve-opening position.

The structure of the valve plate 40 is described in detail below. FIG. 4 is a plan view illustrating the valve plate 40; FIG. 5 is a cross-sectional view illustrating the valve plate 40, taken along the line 5—5 in FIG. 4; and FIG. 6 is a cross-sectional view illustrating the check valve 30 in the valve-opening position. The valve plate 40 is press-cut from a thin stainless steel elastic plate to be integrally formed as a leaf spring including a leaf element 41, a ring arm element 42, a joint element 43, and a base element 44.

The leaf element 41, having a shape substantially identical with the external form of the stepped seat element 36, is seated onto and separated from the seat surface 36a of the stepped seat element 36 in order to close and open the flow outlet 33a of the body 32.

As shown in FIG. 4, the ring arm element 42 is arranged around the leaf element 41 via a predetermined space S to come into contact with the lower peripheral surface 36b of the stepped seat element 36. The ring arm element 42 is linked with the leaf element 41 via the joint element 43, which is formed on one end of the ring arm element 42 and includes two bridging elements 43a arranged in parallel.

The base element 44 formed on the other end of the ring arm element 42, that is, opposite to the joint element 43, is received by the valve support projection 37 on the body 32.

Figure 7:
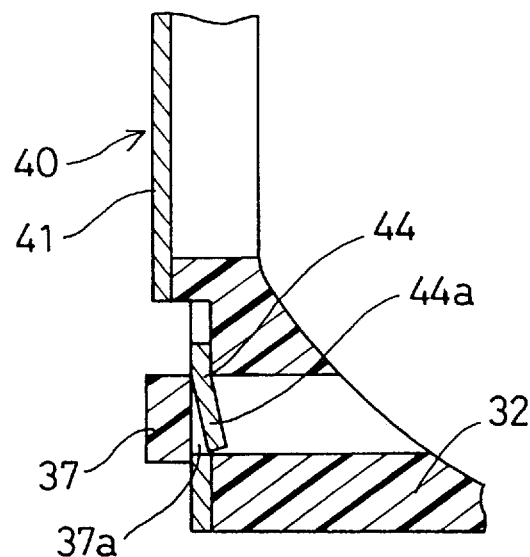
FIG. 7 is an enlarged, partial cross-sectional view showing the base element of the valve plate after being attached to the body.
Figure 8:
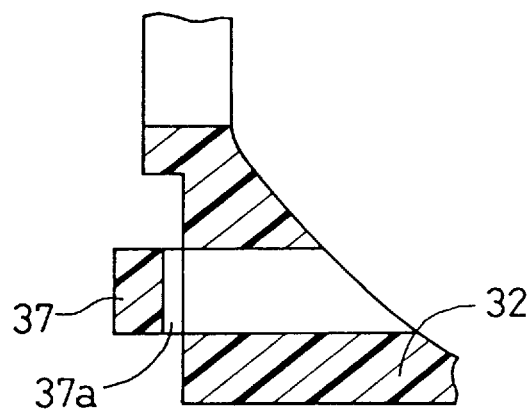
FIG. 8 is a cross sectional view showing the base element of the valve plate before being attached to the body.
Figure 8:
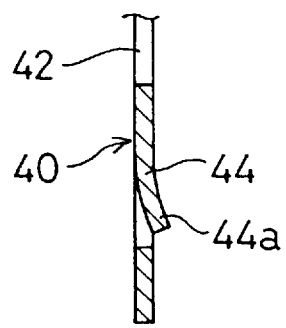

FIG. 7 is an enlarged cross-sectional view showing the base element 44 of the valve plate 40 after being attached to the body 32, and FIG. 8 is a cross-sectional view showing the base element 44 of the valve plate 40 before being attached to the body 32. Referring to FIGS. 7 and 8, the base element 44 of the valve plate 40 is inserted into the notch 37a formed in the valve support projection 37 on the body 32, and a nib 44a of the base element 44 works to secure the valve plate 40 to the body 32.

The check valve 30 thus constructed works in the following manner. A supply of fuel fed into the flow inlet 33b of the body 32 passes through the fuel path 31 to reach the flow outlet 33a, and presses the leaf element 41 of the valve plate 40. Since the valve plate 40 is securely fixed to the body 32 via the base element 44 thereof, the valve plate 40 opens relative to the base element 44 as shown in FIG. 6. The leaf element 41 of the valve plate 40 pressed by the supplied fuel generates a force, which is applied to the ring arm element 42 via the joint element 43, to move or incline the ring arm element 42 relative to the base element 44, thereby forming a space between the leaf element 41 and the seat element 36. The supplied fuel accordingly flows through the space and is fed into the tank body 12 via the connection pipe 22.

In the structure of the check valve 30, the leaf element 41 of the valve plate 40 is linked with the base element 44 via the narrow joint element 43 and ring arm element 42. Referring to FIG. 6, the leaf element 41 opens to be placed substantially in parallel with the flow outlet 33a of the body 32 while the ring arm element 42 is inclined. This allows a sufficiently large space to be formed between the leaf element 41 and the flow outlet 33a, and the fuel fed from the flow inlet 33b thus smoothly flows out through the sufficiently large space. When the flow of fuel is stopped thus removing the bias from the leaf exhaust, the arm element 42 biases the leaf element 41 toward the seat element 36. The whole surface of the leaf element 41 is seated almost simultaneously and in parallel configuration onto the seat surface 36a of the stepped seat element 36. This ensures high sealing properties even by a small spring force.

The check valve 30 of the embodiment has the following advantages:

(1) The spring function defined by the narrow ring arm element 42 of the valve plate 40 generates a force for pressing the leaf element 41 towards the stepped seat element 36 to close the valve plate 40. The force required for opening the valve plate 40, more specifically, the force for inclining the ring arm element 42 and moving the leaf element 41 to its valve-opening position, can thus be set arbitrarily by varying the width of the ring arm element 42.

(2) In the structure of the embodiment, the leaf element 41 of the valve plate 40 is in contact with and seated on the upper seat surface 36a of the stepped seat element 36, whereas the base element 44 and the ring arm element 42 are received by the lower peripheral surface 36b which is positioned inwardly from the seat surface 36a. This allows the leaf element 41 to be seated on the seat surface 36a of the stepped seat element 36 while being pressed towards the seat surface 36a by the ring arm element 42 and the joint element 43. This structure ensures the high sealing properties of the leaf element 41 against the seat surface 36a.

(3) The check valve 30 consists of only two parts, that is, the cylindrical body 32 and the valve plate 40. Compared with the conventional check valve described above, the check valve 30 of this structure requires a lower number of parts, thereby effectively reducing the manufacturing cost.

(4) The valve plate 40 can be attached to the body 32 only by inserting the base element 44 of the valve plate 40 into the notch 37a of the valve support projection 37 on the body 32. This assembling process is simple and does not require much time or labor.

(5) The flange 35 formed around the body 32 is firmly held by the resilient force of the inlet hose 24 as shown in FIG. 2, so that the check valve 30 is securely fitted between the inlet hose 24 and the connection pipe 22. The check valve 30 is freely attached to and detached from the connection pipe 22 via the fitting click 34 formed on the body 32 of the check valve 30. This structure saves the time and labor required for attachment and replacement of the check valve 30.

(6) The body 32 has the tapered surface 39a arranged immediately before the flow outlet 33a. The tapered surface 39a leads a supply of fuel passing through the fuel path 31 of the body 32 to the flow outlet 33a as a laminar flow. This effectively prevents the supplied fuel from forming a turbulent flow and applying an excessive force to the valve plate 40, thereby protecting the valve plate 40 from plastic deformation.

(7) The check valve 30 can be attached to the second end 22b of the connection pipe 22, which is previously welded to the tank body 12. This mounting process does not require much time or labor.

There may be many modifications, alternations, and changes without departing from the scope or spirit of essential characteristics of the invention. It is thus clearly understood that the above embodiment is only illustrative and not restrictive in any sense. Examples of possible modification are given below.

(1) In the above embodiment, the arm element 42 is formed along the substantially whole periphery of the leaf element 41. The shape and the orientation of the arm element may, however, be set arbitrarily by taking account of the spring force generated by the arm element and the cross-sectional area of the possible flow path for supplied fuel.

Figure 9:
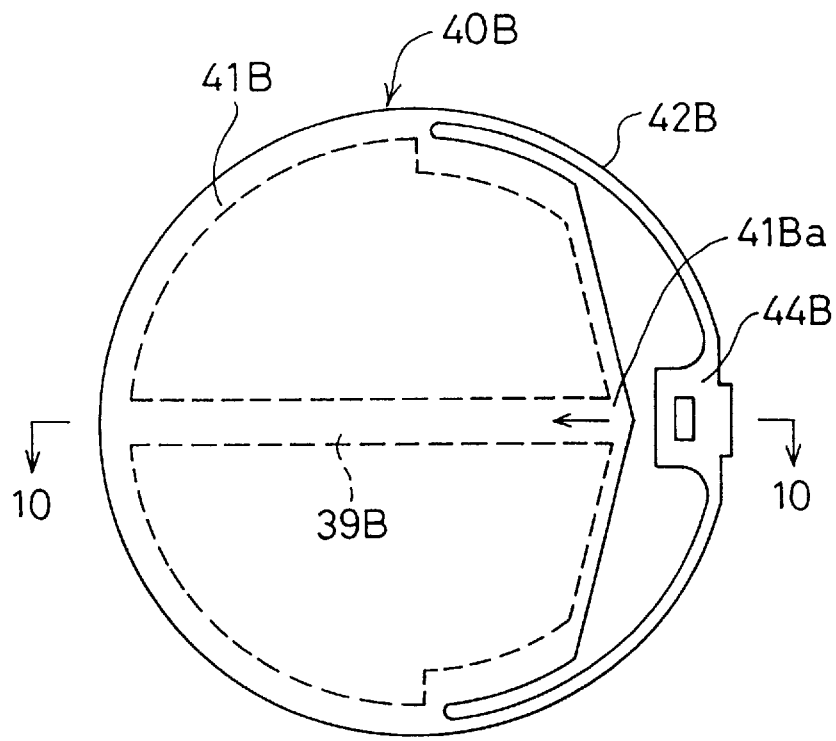
FIG. 9 is a plan view illustrating another valve plate of the invention having a modified structure.
Figure 10:
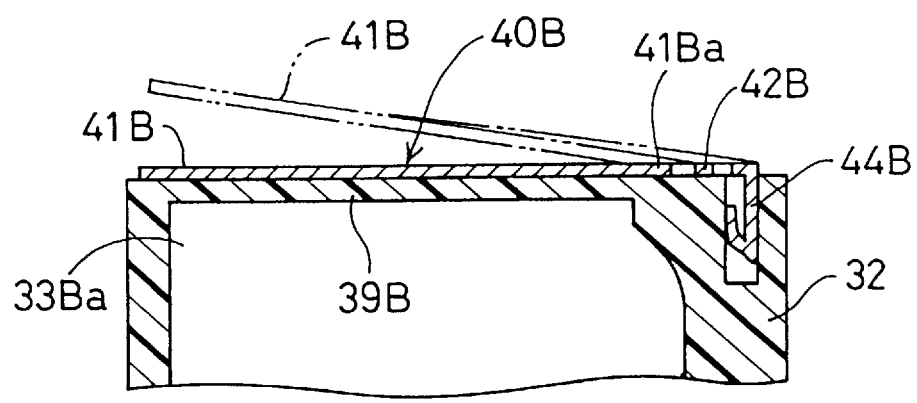
FIG. 10 is a cross-sectional view illustrating the valve plate, taken on the line 10—10 of FIG. 9.

In a modified structure shown in FIG. 9, an arm element 42B is formed along substantially half the periphery of a leaf element 41B of a valve plate 40B. In the valve plate 40B of this structure, a base element 44B used for fixing the valve plate 40B to a body 32B (see FIG. 10) is arranged on a substantial center of the arm element 42B. The leaf element 41B of the valve plate 40B further includes a pointed support element 41Ba disposed at a position inside and facing the base element 44B. More particularly, the pointed support element 41Ba is placed at a position guided by a bridging element 39B formed at a flow outlet 33Ba of the body 32B shown in FIG. 10. This structure makes the arm element 42B inclined relative to the base element 44B, when the leaf element 41B is moved to its valve-opening position. With the valve-opening operation of the leaf element 41B, the pointed support element 41Ba of the leaf element 41B is guided by and slides on the bridging element 39B. Such guiding mechanism stabilizes the movement of the leaf element 41B and accordingly ensures stable valve-opening operation. The bridging element 39B preferably has a triangular cross-section for the smooth flow of fuel.

Figure 11:
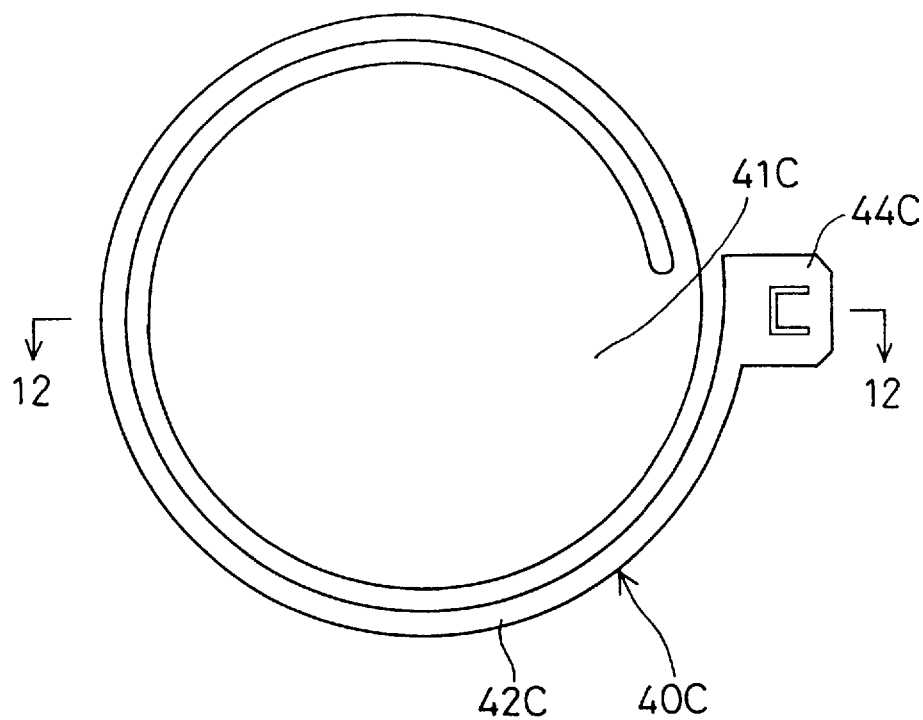
FIG. 11 is a plan view illustrating still another valve plate of the invention having another modified structure.
Figure 12:
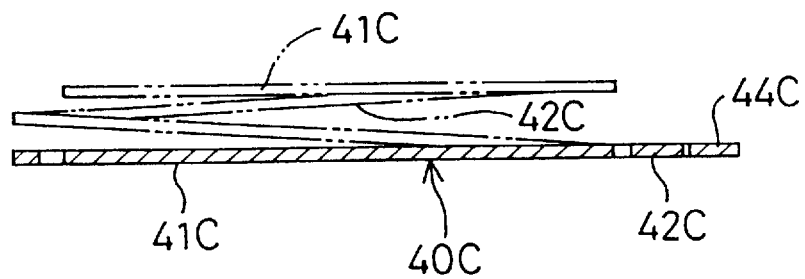
FIG. 12 is a cross-sectional view illustrating the valve plate, taken on the line 12—12 of FIG. 11.

(2) FIG. 11 shows another structure, in which a valve plate 40C includes an arm element 42C arranged in a spiral form. The spiral arm element 42C has one end linked with a leaf element 41C and is disposed around the leaf element 41C of the valve plate 40C. A base element 44C is coupled with the other end of the arm element 42C. This structure makes the spiral arm element 42C inclined in a helical form as shown in FIG. 12, when the leaf element 41C is moved to its valve-opening position.

Figure 13:
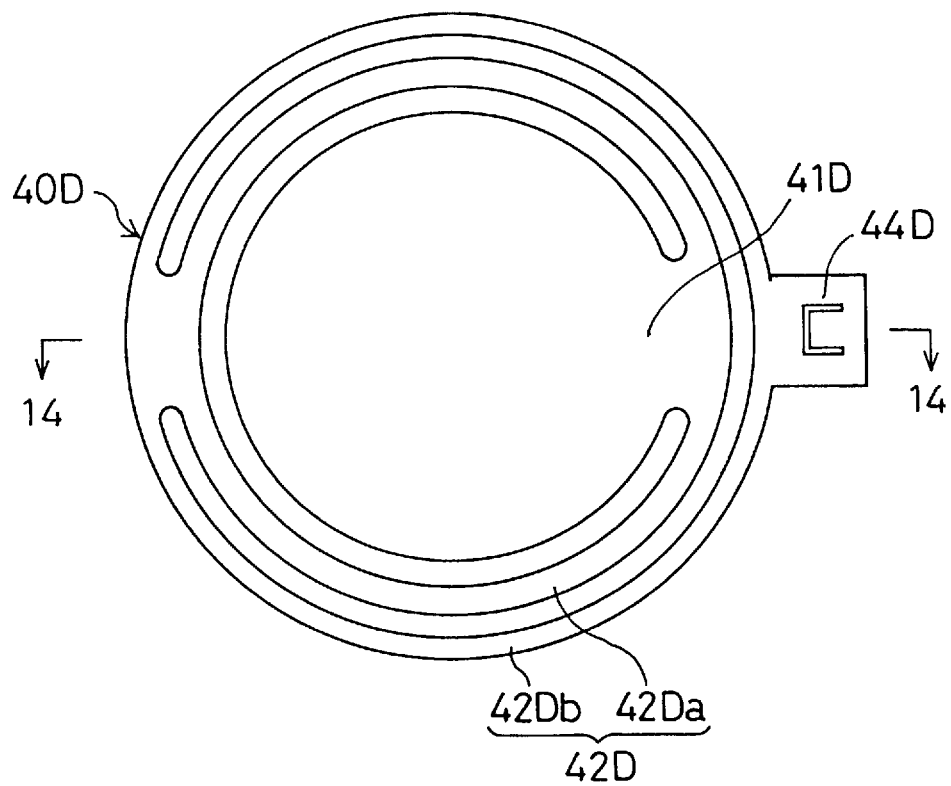
FIG. 13 is a plan view illustrating another valve plate of the invention having a different modification.
Figure 14:
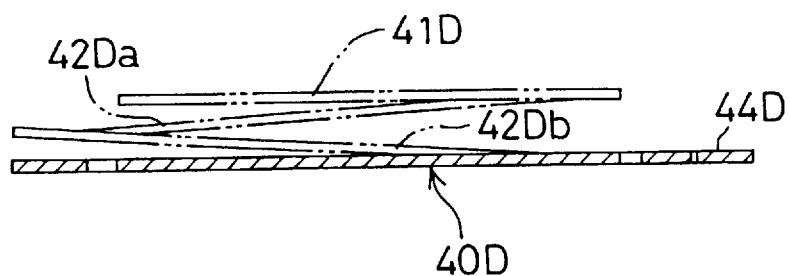
FIG. 14 is a cross-sectional view illustrating the valve plate, taken on the line 14—14 of FIG. 13.

(3) FIG. 13 shows still another structure, in which a valve plate 40D includes a plurality of arm elements 42D arranged concentrically with a leaf element 41D. An inner arm element 42Da is placed around the leaf element 41D of the valve plate 40D, whereas an outer arm element 42Db is disposed outside and around the inner arm element 42Da. The inner arm element 42Da has one end linked with the leaf element 41D and the other end coupled with one end of the outer arm element 42Db. A base element 44D is joined with the other end of the outer arm element 42Db. This structure makes the inner arm element 42Da and the outer arm element 42Db inclined in a Z form as shown in FIG. 14, when the leaf element 41D is moved to its valve-opening position.

Figure 15:
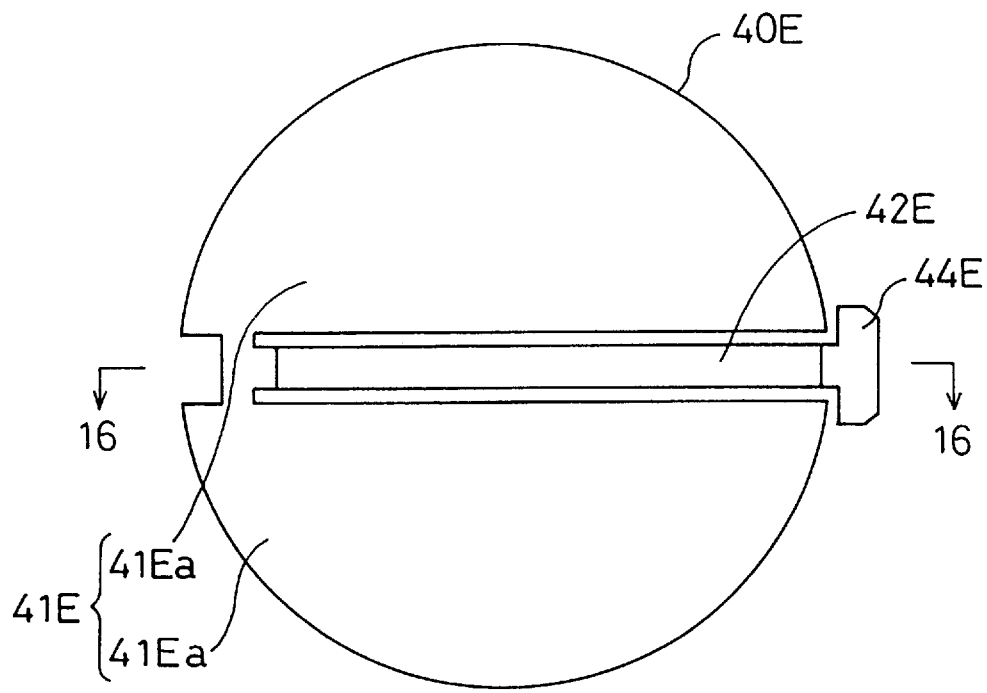
FIG. 15 is a plan view illustrating still another valve plate of the invention having another modification.
Figure 16:
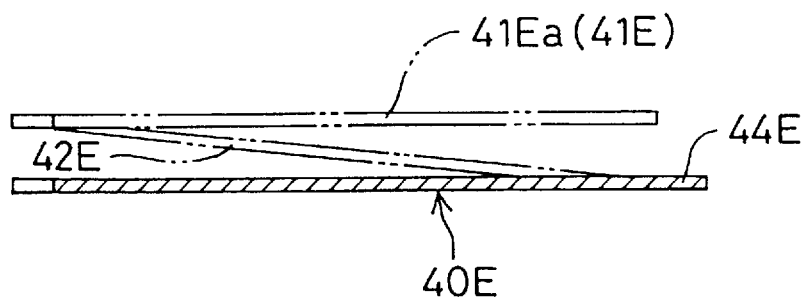
FIG. 16 is a cross-sectional view illustrating the valve plate, taken on the line 16—16 of FIG. 15.
Figure 17:
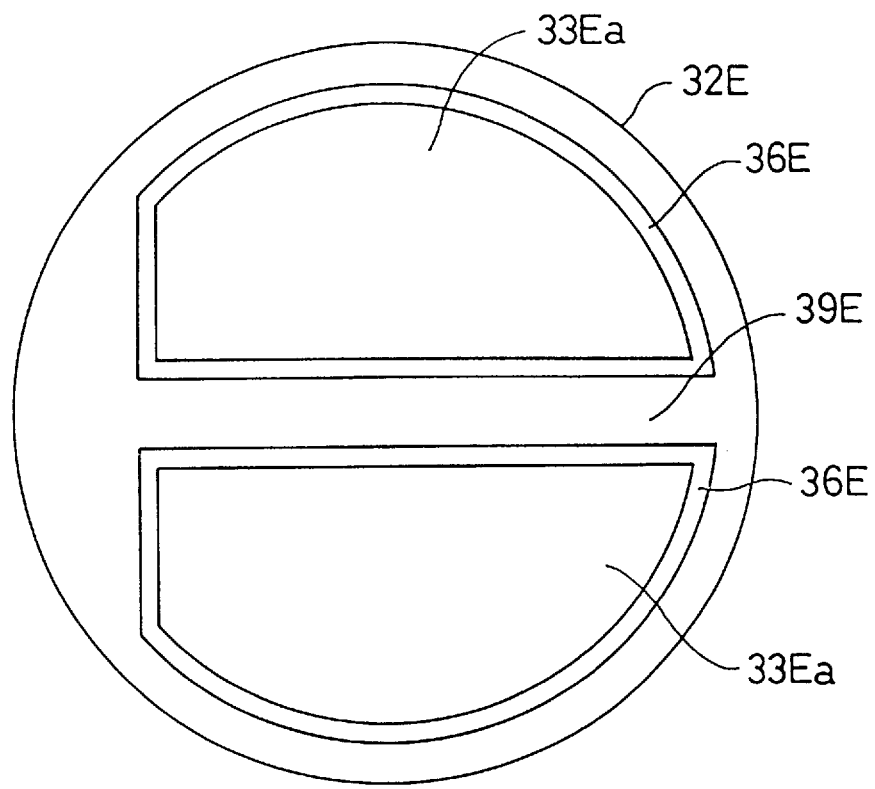
FIG. 17 shows a structure in the vicinity of the flow outlets of the body in the modified structure of FIG. 15.

(4) FIG. 15 shows another possible structure, in which a valve plate 40E includes a leaf element 41E split into two pieces. In this example, the leaf element 41E of the valve plate 40E consists of two split sections 41Ea, 41Ea. Substantially semicircular stepped seat elements 36E are formed on a body 32E corresponding to the circumferences of the respective split sections 41Ea, 41Ea as shown in FIG. 17. A bridging element 39E for dividing a flow outlet 33Ea into two sections is formed between the two substantially semicircular stepped seat elements 36E. An arm element 42E of the valve plate 40E is disposed between the two split sections 41Ea, 41Ea of the leaf element 41E. The arm element 42E has one end connecting with the leaf element 41E and the other end linked with a base element 44E. This structure allows the arm element 42E to be inclined relative to the base element 44E as shown in FIG. 16, thereby moving the respective split sections 41Ea, 41Ea of the leaf element 41E to their valve-opening positions.

Figure 18:
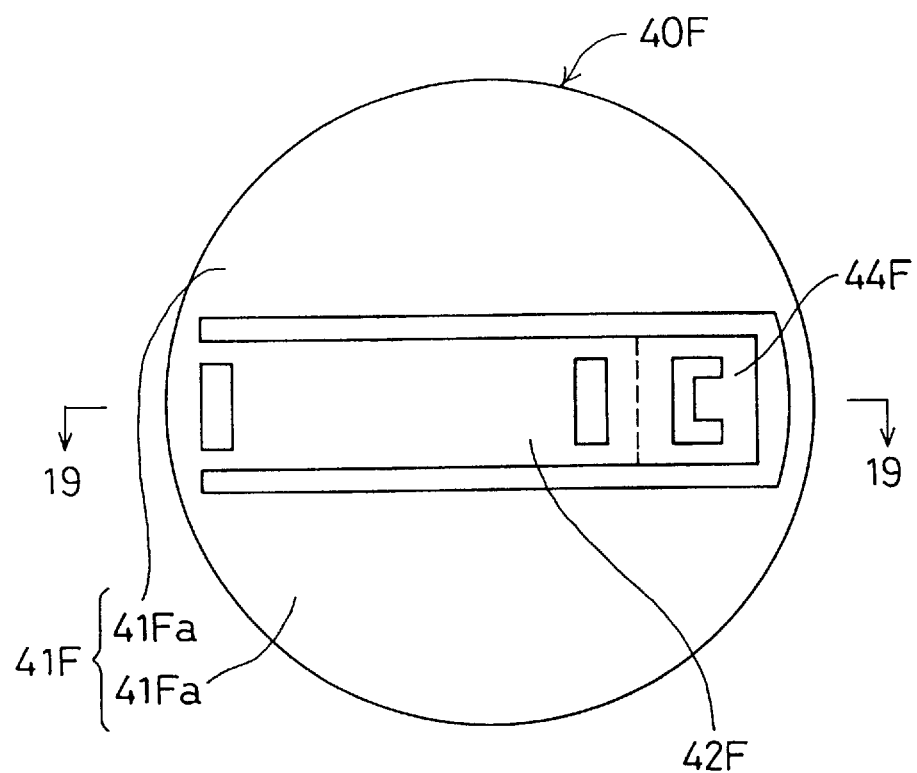
FIG. 18 is a plan view illustrating another valve plate of the invention having still another modification.
Figure 19:
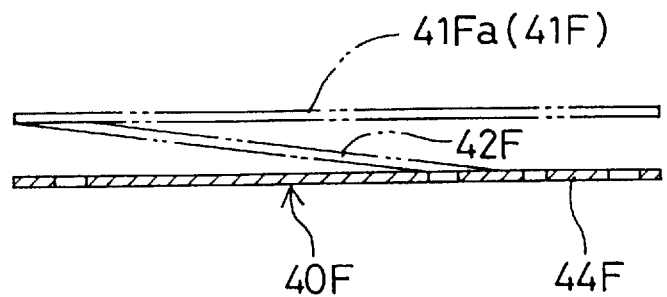
FIG. 19 is a cross-sectional view illustrating the valve plate, taken on the line 19—19 of FIG. 18.

(5) FIG. 18 shows still another possible structure, in which a valve plate 40F includes a leaf element 41F split into two pieces in another way. The leaf element 41F of the valve plate 40F consists of two split sections 41Fa, 41Fa which are linked with each other at both ends thereof. An arm element 42F is disposed between the two split sections 41Fa, 41Fa of the leaf element 41F. The arm element 42F has one end connecting with the circumferential portion of the leaf element 41F and the other end linked with a base element 44F. This structure allows the arm element 42F to be inclined relative to the base element 44F as shown in FIG. 19, thereby moving the respective split sections 41Fa, 41Fa of the leaf element 41F to their valve-opening positions.

Figure 20:
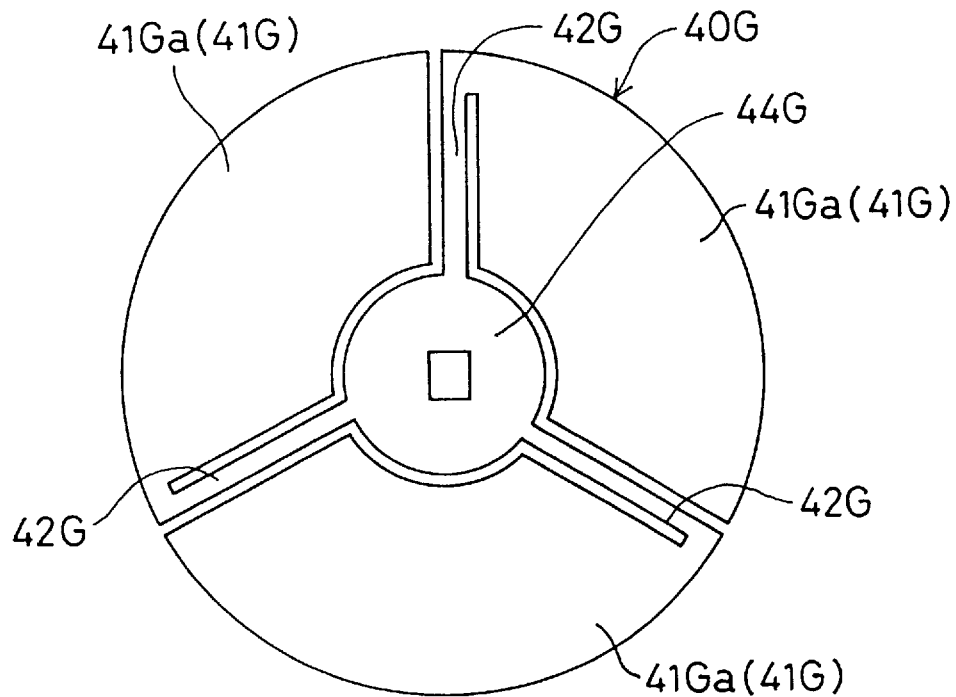
FIG. 20 is a plan view illustrating another valve plate of the invention having a different modification.
Figure 21:
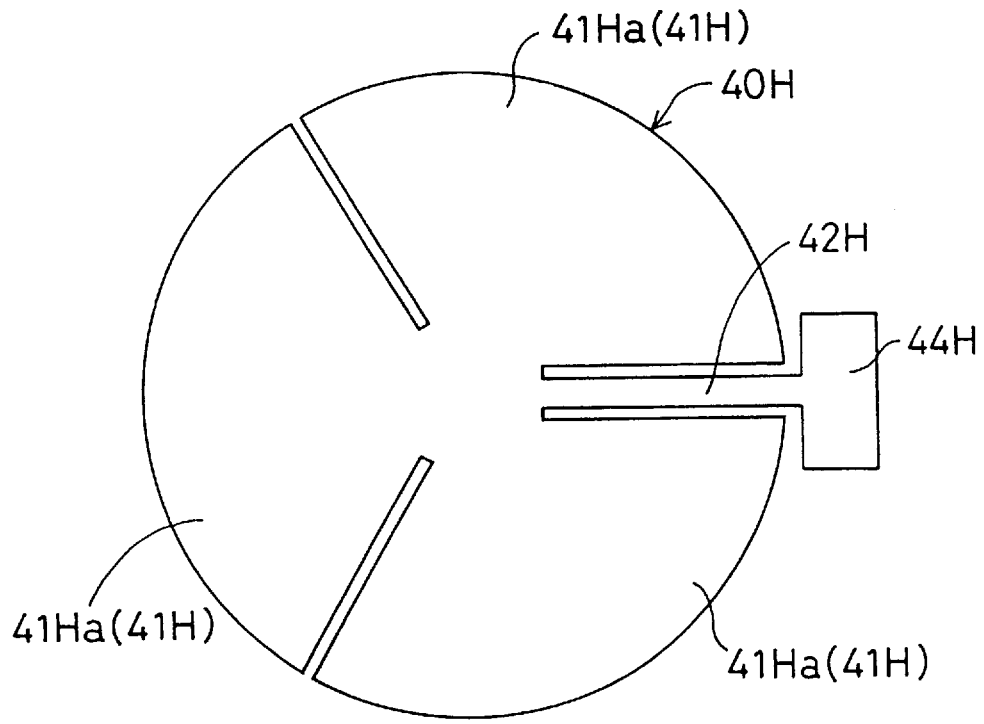
FIG. 21 is a plan view illustrating another valve plate of the invention having another modification.
Figure 22:
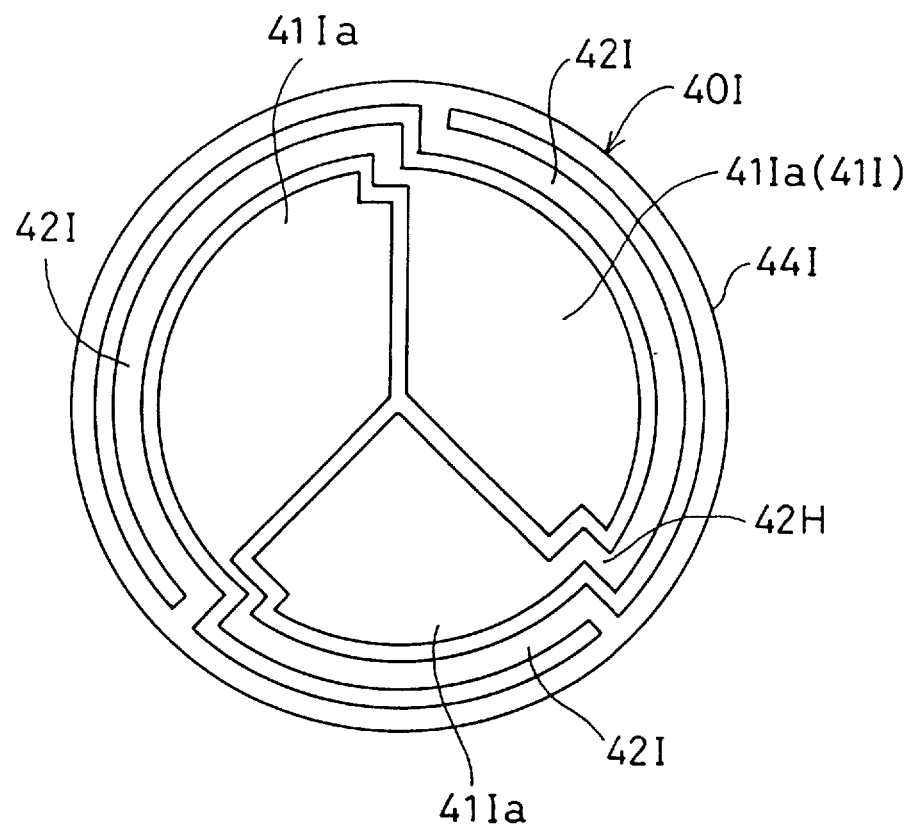
FIG. 22 is a plan view illustrating another valve plate of the invention having yet another modification.

(6) FIGS. 20 through 22 respectively show other modified structures, in which valve plates 40G through 40I have leaf elements 41G through 41I split into three sections in various ways. The leaf element 41G of the valve plate 40G shown in FIG. 20 includes three fan-shaped split sections 41Ga. The respective arc peripheries of the fan-shaped split sections 41Ga are seated on and separated from seat elements of a body (not shown). This valve plate 40G has three arm elements 42G radically extending from a substantial center of the leaf element 41G. Each arm element 42G is disposed between each adjacent pair of the fan-shaped split sections 41Ga, and has one end connecting with the adjoining fan-shaped split section 41Ga and the other end linked with a base element 44G disposed on the substantial center of the valve plate 40G. This structure allows the radially-arranged three arm elements 42G to be lifted up relative to the base element 44G, thereby moving the respective fan-shaped split sections 41Ga of the leaf element 41G to their valve-opening positions.

(7) The valve plate 40H shown in FIG. 21 is provided with a leaf element 41H consisting of three fan-shaped split sections 41Ha and with an arm element 42H disposed between a predetermined pair of the fan-shaped split sections 41Ha. The arm element 42H has one end connecting with a central portion of the leaf element 41H and the other end linked with a base element 44H. This structure allows the arm element 42H to be inclined relative to the base element 44H, thereby moving the respective split sections 41Ha of the leaf element 41H to their valve-opening positions.

(8) The valve plate 40I shown in FIG. 22 is provided with a leaf element 41I consisting of three fan-shaped split sections 41Ia. The valve plate 40I includes three arm elements 42I respectively extending from the adjoining fan-shaped split sections 41Ia. Each arm element 42I extending from an adjacent fan-shaped split section 41Ia is arranged to correspond with the periphery of the adjacent fan-shaped split section 41Ia, and has one end connecting with the peripheral portion of the adjoining split section 41Ia and the other end linked with a circular base element 44I. This structure makes the respective arm elements 42I inclined in a helical form relative to a site supported by the circular base element 44I, thereby moving the respective split sections 41Ia of the leaf element 41I to their valve-opening positions.

Figure 23:
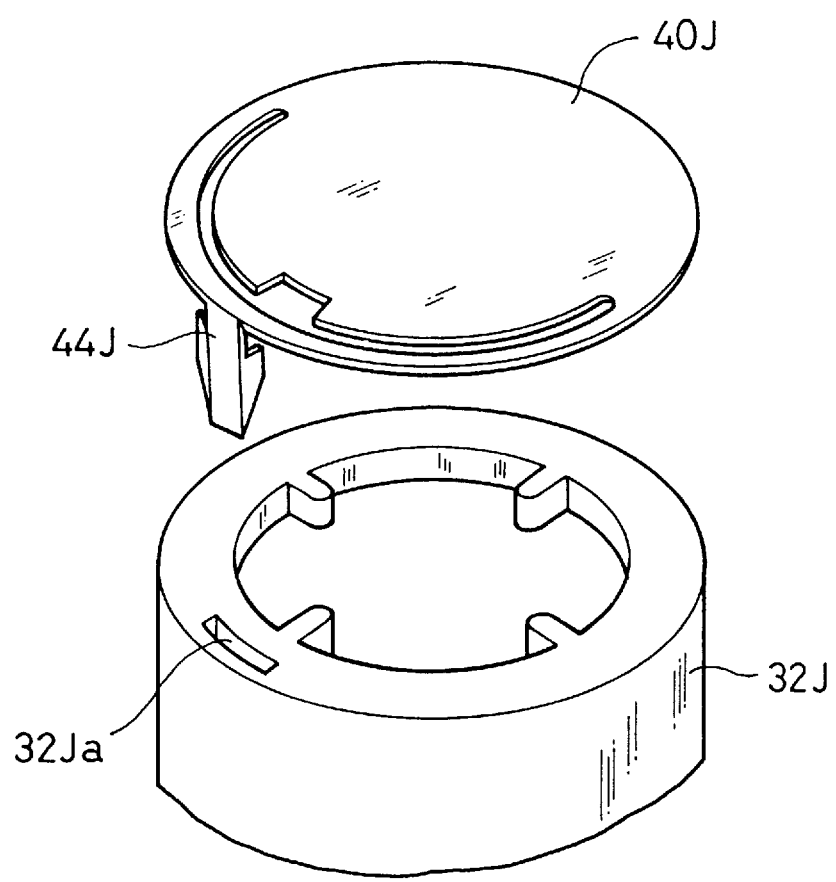
FIG. 23 is an exploded perspective view illustrating a body and a valve plate of a modified structure of the invention.

(9) The base element used for fixing the valve plate to the body may have any desired shape and structure. In one embodiment shown in FIG. 23, an anchor-like base element 44J is protruded from a valve plate 40J to be arranged substantially perpendicular to the surface of the valve plate 40J. The base element 44J of this configuration is inserted into a slit 32Ja formed on an end face of a body 32J, thereby being conically curved and deformed, so that the valve plate 40J is securely fixed to the body 32J.

Figure 24:
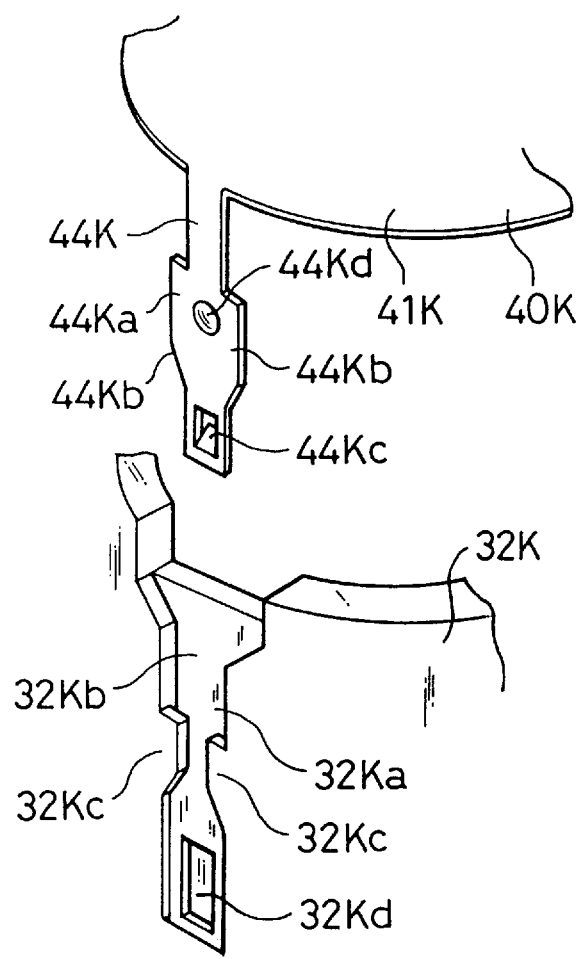
FIG. 24 is a partial, exploded perspective view illustrating a body and a valve plate of another modified structure of the invention.

(10) FIG. 24 shows another shape applicable to the base element of the valve plate. A valve plate 40K of this example includes a base element 44K protruded from a leaf element 41K to be arranged substantially perpendicular to the surface of the leaf element 41K. The base element 44K includes a main plate 44Ka, extensions 44Kb extending from both sides of the main plate 44Ka, a partly-cut end plate 44Kc, and a hemispherical projection 44Kd. A fitting groove 32Ka for receiving the base element 44K is formed on a side face of a body 32K. The fitting groove 32Ka has a pair of pressure pieces 32Kc, which are projected from a groove bottom 32Kb and arranged to face each other across a predetermined space. The fitting groove 32Ka further includes a stepped element 32Kd placed below the pair of pressure pieces 32Kc. When the base element 44K is inserted into the fitting groove 32Ka, the base element 44K is held between the pressure pieces 32Kc and the stepped element 32Kd, while the hemispherical projection 44Kd on the main plate 44ka of the base element 44K receives a pressing force from the groove bottom 32Kb to enhance the frictional force toward the pressure pieces 32Kc. The partly-cut end plate 44Kc is received in the stepped element 32Kd to prevent the valve plate 40K from accidentally slipping off the body 32K. This structure allows the valve plate 40K to be securely fixed to the body 32K through simple insertion of the base element 44K into the fitting groove 32Ka.

Figure 25:
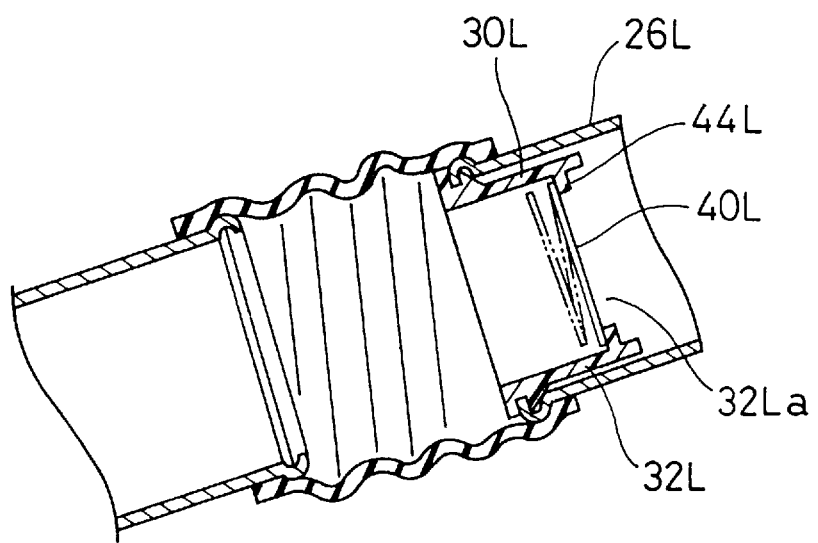
FIG. 25 shows a modified structure of the invention, in which a check valve is placed at a different position.
Figure 26:
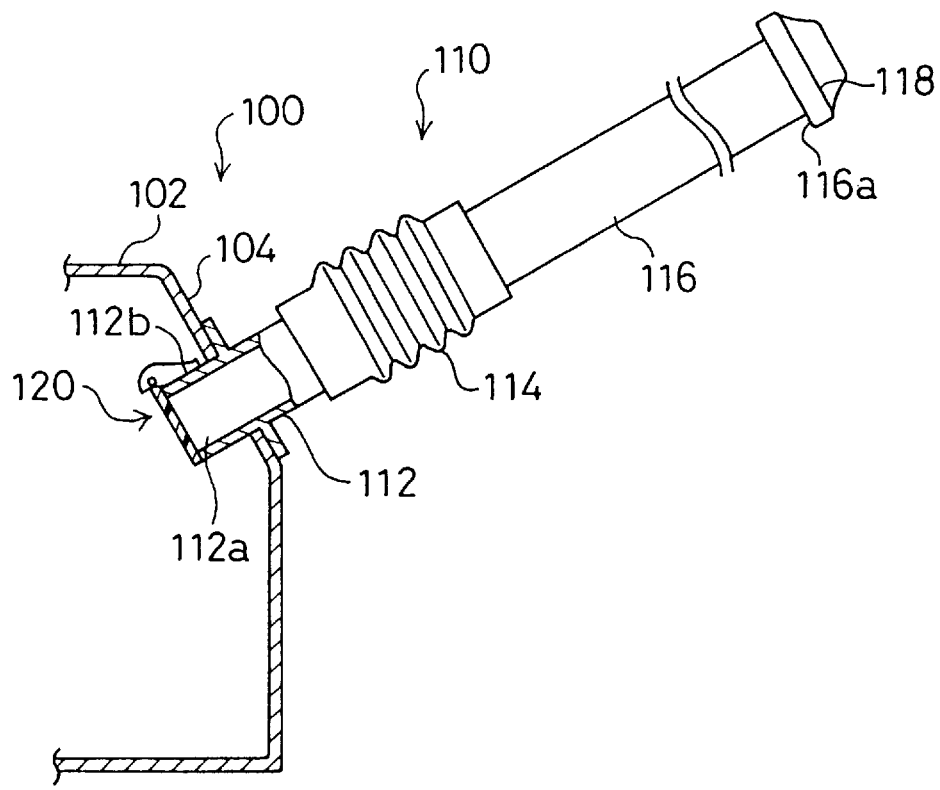
FIG. 26 is a side sectional view illustrating an essential part of a conventional fuel tank structure incorporated in automobiles.
Figure 27:
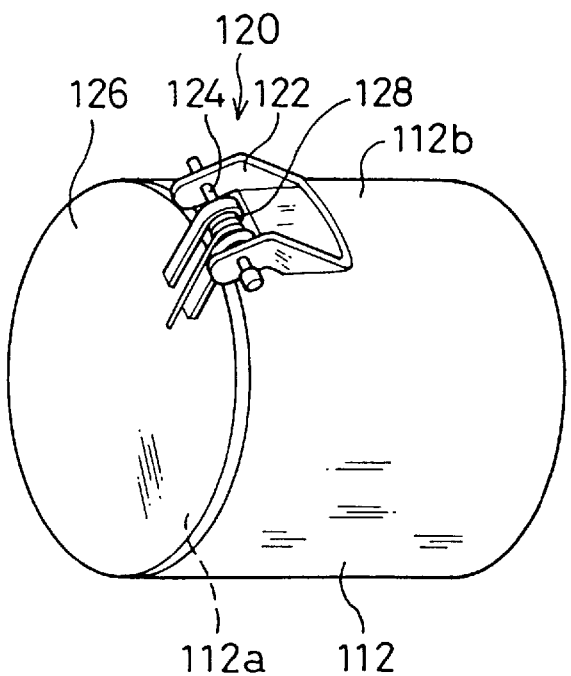
FIG. 27 is a perspective view illustrating appearance of a conventional check valve.

(11) In the embodiment of FIG. 1, the check valve 30 is attached to the second end 22b of the connection pipe 22. The position of the check valve is, however, not restricted to this arrangement, but the check valve may be set at any desired position in the fuel supply pathway. For example, a check valve 30L may be attached to a downstream end of an inlet filler pipe 26L as shown in FIG. 25. In this structure, the check valve 30L is oriented in an inverse direction as compared to that shown in FIG. 1, and a valve plate 40L is placed at a flow inlet 33La of a body 32L to open relative to a base element 44L.

(12) The leaf element of the valve plate may have any desired shape corresponding to the shape of the fuel path; for example, triangular, square, and other polygonal shapes other than the circular and arc shapes described above.

(13) Although the valve plate is made of stainless steel in the above embodiment, any other materials having appropriate spring characteristics, for example, resins, may be applicable to the valve plate.

(14) The width of the arm element is varied arbitrarily to adjust the force required for the valve-opening operation.

The scope and spirit of the present invention can be appreciated with reference to the appended claims.

What is claimed is:

1. A check valve comprising:
   an axially extending passage-defining member having a first end and an internal hollow tubular passage extending therethrough;
   an annular flange extending inwardly in a radial direction from said first end and defining a fluid flow port;
   a seat element extending axially upward from said annular flange; and
   a valve plate positioned over said fluid flow port, said valve plate comprising a leaf element and an integrally formed arm element, said leaf element having a substantially disc shape and being constructed and arranged to alternate between an open-valve position, in which said fluid flow port is open and a closed-valve position where fluid flow is restricted,
   said arm element having a base element fixed to said annular flange and having two annular arm parts each extending from said base element at least partially around a periphery of said leaf element, and each terminating at a distal end connected to said leaf element,
   wherein when said leaf element is biased in the open-valve position, said arm element moves relative to the base element to define a space between said leaf element and said seat element, thereby permitting fluid to flow past through said fluid flow port, and when said bias is removed, said arm element presses said leaf element toward said seat element to close said fluid flow port.

2. A check valve in accordance with claim 1, wherein said valve plate is press-cut from a metal plate.

3. A check valve in accordance with claim 1, wherein said valve plate is integrally made from a resin plate.

4. The check valve of claim 1, wherein said seat element comprises an annular stepped portion surrounding said fluid flow port, and said base element is received by a portion of said annular flange at a position inward of said stepped portion of said seat element, thereby pressing said leaf element toward said seat element via said arm element.

5. A check valve in accordance with claim 1, further comprising at least one support projection extending radially from an inner wall of said passage-defining member toward a center of said flow port, said support projection coming into contact with a circumferential portion of said leaf element of said valve plate when said leaf element is disposed in its seated position.

6. A check valve in accordance with claim 1, wherein said passage-defining member further comprises a valve support element having a notch, and said base element is inserted into said notch, so that said valve plate is securely attached to said valve support element.

7. A check valve in accordance with claim 1, wherein said passage defined by said passage-defining member has a cylindrical shape and a cross-sectional area greater than that of said flow port, and said passage-defining member includes a tapered surface, which is arranged immediately inward of said flow port and connects an inner surface of said passage-defining member with said flow port to form a continuous face in said passage while gradually decreasing a cross-sectional area of said passage.

8. A check valve in accordance with claim 1, wherein said leaf element is generally disk-shaped and said arm element is arranged along substantially half a circumference of said leaf element and linked with said leaf element via a joint element; and wherein said base element is disposed substantially at the center of said arm element;

said leaf element further comprises a pointed support element disposed at a position facing said base element;

said passage-defining member further comprises a bridging element passing through a substantial center of said flow port; and said pointed support element of said leaf element is constructed and arranged to be guided by and in sliding contact with said bridging element when said leaf element is moved to its valve-opening position.

9. A check valve in accordance with claim 1, wherein said leaf element has a disk-like shape, and said arm element comprises a plurality of circular arm sections arranged around said leaf element so as to be concentric with said leaf element.

10. A check valve in accordance with claim 1, wherein said base element comprises a projection extending from said arm element so as to be substantially perpendicular to said arm element, and said passage-defining member includes a slit, into which said projection of said base element is inserted.

11. A fuel tank assembly comprising:

a tank body for storing fuel;

a fuel supply mechanism for feeding fuel into said tank body, said fuel supply mechanism having an opening; and a check valve disposed in said opening, comprising:

an axially extending passage-defining member having a first end and an internal hollow tubular passage extending therethrough;

an annular flange extending inwardly in a radial direction from said first end and defining a fluid flow port;

a seat element extending axially upwardly from said annular flange; and a valve plate positioned over said fluid flow port, said valve plate comprising a leaf element, and an integrally formed arm element, said leaf element having a substantially disc shape and constructed and arranged to alternate between an open-valve position in which said fluid flow port is open and a closed-valve position where fluid flow is restricted, said arm element having a base element fixed to said annular flange and having two annular arm parts each extending from said base element at least partially around a periphery of said leaf element, and each terminating at a distal end connected to said leaf element, wherein when said leaf element is biased in the open-valve position, said arm element moves relative to the base element to define a space between said leaf element and said seat element, thereby permitting fuel to flow through said fluid flow port, and when said bias is removed, said arm element presses said leaf element toward said seat element to close said fluid flow port.

12. A fuel tank in accordance with claim 11, wherein said fuel supply mechanism includes an engagement element, and said passage-defining member of said check valve includes a fitting tab adaptable to be resiliently engaged with and disengaged from said engagement element.

13. A fuel tank in accordance with claim 11, wherein said fuel supply mechanism comprises a connection pipe fixed to said tank body and a rubber hose connected to said connection pipe;

said passage-defining member of said check valve includes a flange element extending outwardly from an end of an outer surface thereof; and said passage-defining member is fitted in an opening of said connection pipe while said flange element is held by said rubber hose, so that said check valve is securely fixed to said opening of said connection pipe.

14. A fuel tank in accordance with claim 11, wherein said fuel supply mechanism further includes a connection pipe welded to said tank body, a rubber hose connected to said connection pipe, and an inlet filler pipe coupled with said rubber hose, said check valve being attached to an opening of said inlet filler pipe directly connected to said rubber hose.

15. The check of claim 1, wherein said seat element coincides with the fluid flow port.

16. The check valve of claim 15, wherein said seat element and said fluid flow port are a continuous structure.

17. The fuel tank assembly of claim 11, wherein said seat element coincides with the fluid flow port.

18. The fuel tank assembly of claim 17, wherein said seat element and said fluid flow port are a continuous structure.

* * * * *